United States Patent
Horii (10) Patent No.: US 10,318,521 B2
(45) Date of Patent: Jun. 11, 2019

(54) QUERY PROCESSING WITH BOUNDED STALENESS FOR TRANSACTIONAL MUTATIONS IN NOSQL DATABASE

(71) Applicant: INTERNATIONAL BUSINESS MACHINES CORPORATION, Armonk, NY (US)

(72) Inventor: Hiroshi H. Horii, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 206 days.

(21) Appl. No.: 15/363,313

(22) Filed: Nov. 29, 2016

(65) Prior Publication Data

US 2018/0150503 A1 May 31, 2018

(51) Int. Cl.
| | | |
|---|---|---|
| *G06F 17/30* | (2006.01) | |
| *G06F 16/23* | (2019.01) | |
| *G06F 11/30* | (2006.01) | |
| *G06F 16/338* | (2019.01) | |
| *G06F 16/2453* | (2019.01) | |

(52) U.S. Cl.
CPC ...... *G06F 16/2379* (2019.01); *G06F 11/3065* (2013.01); *G06F 16/2453* (2019.01); *G06F 16/338* (2019.01)

(58) Field of Classification Search
CPC ......... G06F 17/30377; G06F 17/30443; G06F 17/30696; G06F 17/30286; G06F 17/30008; G06F 17/2247; G06F 9/466; G06F 11/3065; G06F 16/2379; G06F 16/2453; G06F 16/338
USPC .......................................... 707/695, 703, 811
See application file for complete search history.

(56) References Cited

U.S. PATENT DOCUMENTS 7,739,262 B2   6/2010   Larson et al.
9,218,385 B2   12/2015  Tan et al.
(Continued)

FOREIGN PATENT DOCUMENTS

WO   2015/088483 A1   6/2015

OTHER PUBLICATIONS

Adewole Ogunyadeka et al., A Multi-Key Transactions Model for NoSQL Cloud Database Systems, 2016 IEEE 2nd International Conference on Big Data Computing Service and Applications (Big Data Service), May 23, 2016 (Year: 2016).*
(Continued)

*Primary Examiner* — Greta L Robinson
(74) *Attorney, Agent, or Firm* — Tutunjian & Bitetto, P.C.; Vazken Alexanian (57) ABSTRACT

A computer-implemented method executed on one or more processors is provided for processing a query for a NoSQL (non-structured query language) database. The computer-implemented method includes periodically monitoring active transactions that started and are committing dirty versions before a specific time, sending a query to fetch a state of the active transactions, and receiving a query result. The computer-implemented method further includes, if the query result includes active transactions, performing a normal query that scans dirty and committed versions. The computer-implemented method further includes, if the query result includes no active transactions, due to a time window indicating a specified staleness, sending a simplified query that scans only committed versions.

20 Claims, 8 Drawing Sheets

(56) References Cited

U.S. PATENT DOCUMENTS

| | | | | |
|---|---|---|---|---|
| 2011/0283045 | A1* | 11/2011 | Krishnan | G06F 9/5027 |
| | | | | 711/102 |
| 2014/0330767 | A1* | 11/2014 | Fowler | G06F 9/466 |
| | | | | 707/607 |
| 2015/0074070 | A1* | 3/2015 | Bortnikov | G06F 17/30348 |
| | | | | 707/703 |
| 2015/0154259 | A1 | 6/2015 | Keeton et al. | |
| 2015/0278281 | A1* | 10/2015 | Zhang | G06F 17/30008 |
| | | | | 707/703 |
| 2015/0302037 | A1* | 10/2015 | Jackson | G06F 17/30893 |
| | | | | 707/736 |
| 2017/0161352 | A1* | 6/2017 | Horii | G06F 17/30592 |

OTHER PUBLICATIONS

Henggang Cui et al., "Exploiting bounded staleness to speed up Big Data analytics," Published in: Proceedings of the 2014 USENIX conference on USENIX Annual Technical Conference. Held in Philadelphia, PA. Jun. 19-20, 2014. pp. 1-12. http://www.cs.cmu.edu/~seunghak/Cui_etal_ATC14.pdf.

Peter Bailis et al., "Probabilistically bounded staleness for practical partial quorums," Published in: Electrical Engineering and Compuyter Sciences University of California at Berkeley. Technical Report No. UCB/EECS-2012-4. Jan. 3, 2012. pp. 1-14. http://www.eecs.berkeley.edu/Pubs/TechRpts/2012/EECS-2012-4.html.

Anita Brigit Matthew et al., "Novel research framework on SN's NoSQL databases for efficient query processing," International Journal of Reasoning-based Intelligent Systems. vol. 7. Issue 3-4. DOI: 10.1504/IJRIS.2015.072959. Abstract retrieved Aug. 8, 2016. http://Inderscienceonline.com/doi/pdf/10.1504/IJRIS.2015.072959. pp. 1-3.

* cited by examiner

QUERY PROCESSING WITH BOUNDED STALENESS FOR TRANSACTIONAL MUTATIONS IN NOSQL DATABASE

BACKGROUND

Technical Field

The present invention relates generally to computing systems, and more specifically, to query processing with bounded staleness in NoSQL databases.

Description of the Related Art

A traditional structured query language (SQL) database is a relational database in which a collection of tables of data items are organized according to a relational model. Relationships can be defined between rows of the tables. A non-structured query language (NoSQL) database stores and retrieves data in a less constrained way than an SQL database.

Data store refers to a data repository that uses a database to manage data stored in the data repository. A data store can include a plurality of computing nodes, each of which uses a database management system to manage data stored in a corresponding computing node. In recent years, scale-out data stores, referred to as NoSQL data stores, are gaining popularity for supporting high-traffic Internet applications. A NoSQL data store is a class of database management systems that do not use a relational database model. Though most of NoSQL data store do not support transactions, clients of a NoSQL data store are able to establish transactions by storing two versions (dirty and committed versions) for each data item and managing transaction states in the same NoSQL data store. However, to select some of all the committed versions that satisfied a condition, a client needs to query not only committed versions, but also dirty versions because some of dirty versions have been committed already.

SUMMARY

In accordance with one embodiment, a computer-implemented method executed on one or more processors for processing a query for a NoSQL (non-structured query language) database is provided. The computer-implemented method includes periodically monitoring active transactions that started and are committing dirty versions before a specific time, sending a query to fetch a state of the active transactions, receiving a query result, if the query result includes active transactions, performing a normal query that scans dirty and committed versions, and, if the query result includes no active transactions, due to a time window indicating a specified staleness, sending a simplified query that scans only committed versions.

In accordance with one embodiment, a computer system for processing a query for a NoSQL (non-structured query language) database is provided. The computer system includes a memory and at least one processor in communication with the memory, wherein the computer system is configured to periodically monitor active transactions that started and are committing dirty versions before a specific time, send a query to fetch a state of the active transactions, receive a query result, if the query result includes active transactions, perform a normal query that scans dirty and committed versions, and, if the query result includes no active transactions, due to a time window indicating a specified staleness, send a single query that scans only committed versions.

Furthermore, embodiments can take the form of a related computer program product, accessible from a computer-usable or computer-readable medium providing program code for use, by or in connection with a computer or any instruction execution system. For the purpose of this description, a computer-usable or computer-readable medium can be any apparatus that can contain means for storing, communicating, propagating or transporting the program for use, by or in a connection with the instruction execution system, apparatus, or device.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

In one or more embodiments, the overhead of query processing is reduced by relaxing consistency with bounded staleness. The exemplary embodiments of the present invention specify a time window that indicates an acceptable staleness. The database guarantees that a query result reflects all the latest committed versions at a certain time s in the window (e.g., if 2-seconds-staleness is specified, the database can return versions that have been updated in 2 seconds).

In one or more embodiments, a client periodically checks a list of transactions that started committing dirty versions after [now( )−u]. Clients and servers are synchronized in Δt and u is less than s−Δt. If a returned list is empty, the client can avoid overheads to query dirty versions until [now( )−u+s]. If u is small, the check frequency becomes low. However, the list can include transactions and the client cannot avoid overheads. In the exemplary embodiments, a client monitors elapsed time to commit dirty versions for each transaction, determines c, which is longer than most elapsed time, and then sets u longer than c. Usually, clients continuously run transactions and queries in application servers. If a client found that a transaction is in a "committed" state for a long time, the client can apply all changes in the query scopes and notify the scopes to the transaction manager. The transaction manager can set the transaction state as "finished only in the scopes."

Astonishing growth and diversity in data have profoundly affected a way that data have been stored and served. Monolithic relational databases that are good at processing structured data and excel in ACID (atomicity, consistency, isolation, durability) cannot handle high-traffic Internet applications in an elastic manner. This is because relational databases put restrictions on data normalization and consistency, and also the relational databases are not able to perform data sharing in an automatic way so that the relational databases are difficult to scale out. To address challenges in flexible schema and elasticity, data stores dealing with columns, key/value pairs, documents and graphs have emerged and have been collectively identified as NoSQL data stores. A NoSQL data store, e.g., HBase, that supports a convergence of transactional and analytics workloads is able to offer balanced "read" and "write" performance.

A NoSQL database environment is a non-relational and largely distributed database system that enables rapid, ad-hoc organization and analysis of extremely high-volume, disparate data types. NoSQL databases are sometimes referred to as cloud databases, non-relational databases, Big Data databases and a myriad of other terms and were developed in response to the sheer volume of data being generated, stored and analyzed by modern users (user-generated data) and their applications (machine-generated data).

In general, NoSQL databases have become the first alternative to relational databases, with scalability, availability, and fault tolerance being key deciding factors. They go well beyond the more widely understood legacy, relational databases (such as Oracle, SQL Server and DB2 databases) in satisfying the needs of today's modern business applications. A very flexible and schema-less data model, horizontal scalability, distributed architectures, and the use of languages and interfaces that are "not only" SQL typically characterize this technology. Contrary to misconceptions caused by its name, NoSQL does not prohibit structured query language (SQL). While it's true that some NoSQL systems are entirely non-relational, others simply avoid selected relational functionality such as fixed table schemas and join operations. For example, instead of using tables, a NoSQL database might organize data into objects, key/value pairs or tuples.

There are four general types of NoSQL databases, each with their own specific attributes:

Graph database—Based on graph theory, these databases are designed for data whose relations are well represented as a graph and has elements which are interconnected, with an undetermined number of relations between them. Examples include: Neo4j and Titan.

Key-Value store—these are some of the least complex NoSQL options. These databases are designed for storing data in a schema-less way. In a key-value store, all of the data within consists of an indexed key and a value, hence the name. Examples of this type of database include: Cassandra, DyanmoDB, Azure Table Storage (ATS), Riak, BerkeleyDB.

Column store—(also known as wide-column stores) instead of storing data in rows, these databases are designed for storing data tables as sections of columns of data, rather than as rows of data. While this simple description sounds like the inverse of a standard database, wide-column stores offer very high performance and a highly scalable architecture. Examples include: HBase, BigTable and HyperTable.

Document database—expands on the basic idea of key-value stores where "documents" contain more complexity in that they contain data and each document is assigned a unique key, which is used to retrieve the document. These are designed for storing, retrieving, and managing document-oriented information, also known as semi-structured data. Examples include: MongoDB and CouchDB.

Major NoSQLs do not support transactions. As used herein, a "transaction" comprises a set of data manipulation operations on the state of a database system managed as a single unit of work, so all the operations must either entirely be completed (committed) or have no effect (aborted). In other words, partial executions of the transaction are not defined (nor desired in general) because the final state of the database can be corrupted. Without the support for transactions, developers can be burdened with ensuring atomic execution of scattered changes in data upon failures as well as when there are concurrent accesses to the same data by multiple clients. In order to process transactions, conventional database systems provide a specific component called the Transaction Manager.

The goal of transaction managers in general is to guarantee the so-called ACID properties of transactions: Atomicity, Consistency, Isolation, and Durability. However, ACID properties are hard to scale when databases have to deal with very large amounts of data and thousands of concurrent users, because the data must be partitioned, distributed and replicated. That is one of the reasons why, with the advent of NoSQL big data stores, transactions were initially left out of the equation. HBase, Dynamo, BigTable, PNUTS, Cassandra, etc. lacked this feature initially. However, with the popularization of NoSQL big datastores in many areas, the need for transactions has become advantageous for certain applications. For example, as applications become larger and more complex, transactions are sometimes needed to maintain consistency of the application.

It has been determined that prior methods, e.g., optimistic currency control (OCC), for handling transactions are insufficient. For example, percolator stores dirty data and transaction states in NoSQL. Each client processes the validation phase of OCC for each store of dirty data (decentralized approach). Omid provides a centralized server that processes the validation phase of OCC. Each client stores dirty data in NoSQL and sends keys of modified values in a transaction to the server (centralized approach).

A transaction of atomically updating a plurality of entries can be also implemented in a NoSQL database in which only atomically updating one entry is guaranteed. The transaction can be implemented without changing the existing NoSQL database by saving a transaction state such as "being active," "committed," and "aborted," and data which is not committed or which is committed but not saved as committed value (hereinafter referred to as "in-flight data") in the NoSQL database.

Specifically, the transaction can be implemented by executing the following steps. In the first step, a transaction state of "being executed" is saved for a transaction ID of identifying the transaction when the transaction is started. In the second step, data used by the transaction for update is saved in the NoSQL database as the in-flight data along with the transaction ID. In the third step, a transaction state of the transaction ID is overwritten to be "committed" when the transaction is committed. In the fourth step, the in-flight data is saved as committed value.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

It is to be understood that the present invention will be described in terms of a given illustrative architecture; however, other architectures, structures, substrate materials and process features and steps/blocks can be varied within the scope of the present invention. It should be noted that certain features may not be shown in all figures for the sake of clarity. This is not intended to be interpreted as a limitation of any particular embodiment, or illustration, or scope of the claims.

Figure 1:
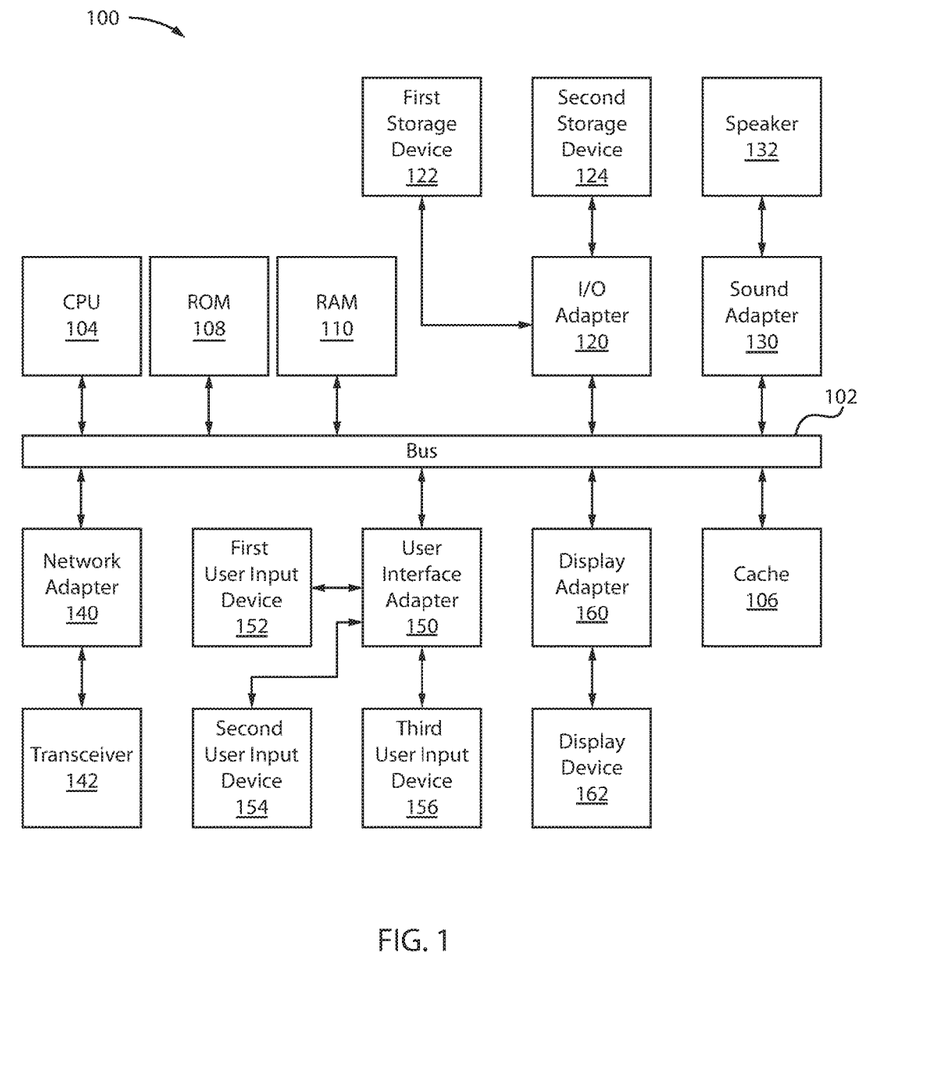
FIG. 1 is a block/flow diagram of an exemplary computing system, in accordance with an embodiment of the present invention.

FIG. 1 is a block/flow diagram of an exemplary computing system, in accordance with an embodiment of the present invention. The computing system 100 can be used in cooperation with a NoSQL database. The computing system 100 further includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from computing system 100.

Of course, the computing system 100 can also include other elements (not shown), as readily contemplated by one of skill in the art, as well as omit certain elements. For example, various other input devices and/or output devices can be included in computing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computing system 100 are readily contemplated by one of ordinary skill in the art given the teachings of the present invention provided herein.

Figure 2:
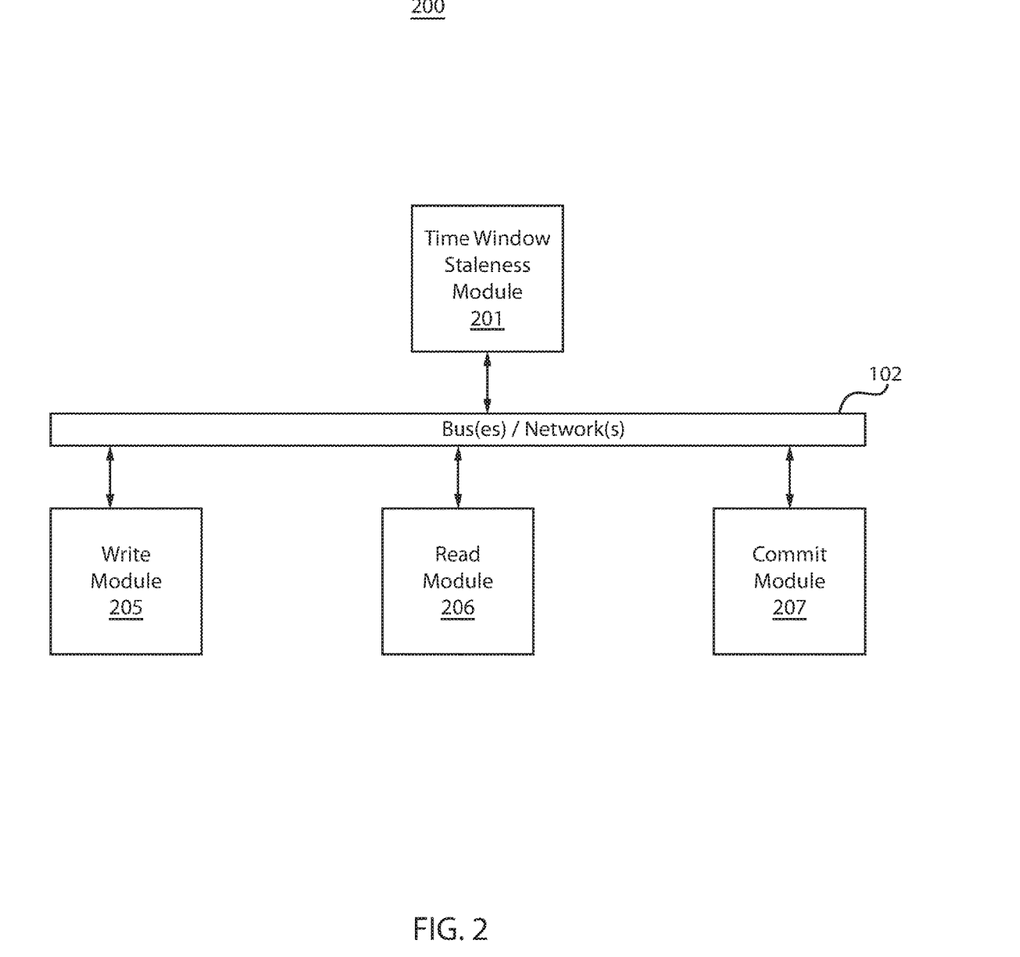
FIG. 2 is a block/flow diagram of an exemplary processing system for processing a query for a NoSQL (non-structured query language) database, in accordance with an embodiment of the present invention.

Moreover, it is to be appreciated that processing system 200 described below with respect to FIG. 2 is a system for implementing respective embodiments of the present invention. Part or all of computing system 100 can be implemented in one or more of the elements of processing system 200. Further, it is to be appreciated that computing system 100 can perform at least part of the method described herein including, for example, at least part of methods described below.

FIG. 2 is a block/flow diagram of an exemplary processing system for processing a query for a NoSQL (non-structured query language) database, in accordance with an embodiment of the present invention.

The system 200 includes at least a time window staleness module 201, a write module 205, a read module 206, and a commit module 207. In the embodiment shown in FIG. 2, the aforementioned elements thereof are interconnected by bus(es)/network(s) 102. However, in other embodiments, other types of connections can also be used. Moreover, in an embodiment, at least one of the elements of system 200 is processor-based, e.g., hardware processor-based. Further, while one or more elements can be shown as separate elements, in other embodiments, these elements can be combined as one element. The converse is also applicable, where while one or more elements can be part of another element, in other embodiments, the one or more elements can be implemented as standalone elements. These and other variations of the elements of system 200 are readily determined by one of ordinary skill in the art, given the teachings of the present invention provided herein, while maintaining the spirit of the present invention.

In one embodiment, the time window staleness module 301 provides for allowing developers to specify time windows of acceptable staleness in the NoSQL database.

The system can further include the write module 205 that provides for write transactions and the read module 206 that provides for read transactions. The commit module 207 provides for commit transactions.

It is understood in advance that although this invention includes a detailed description on cloud computing, implementation of the teachings recited herein are not limited to a cloud computing environment. Rather, embodiments of the present invention are capable of being implemented in conjunction with any other type of computing environment now known or later developed.

Figure 3:
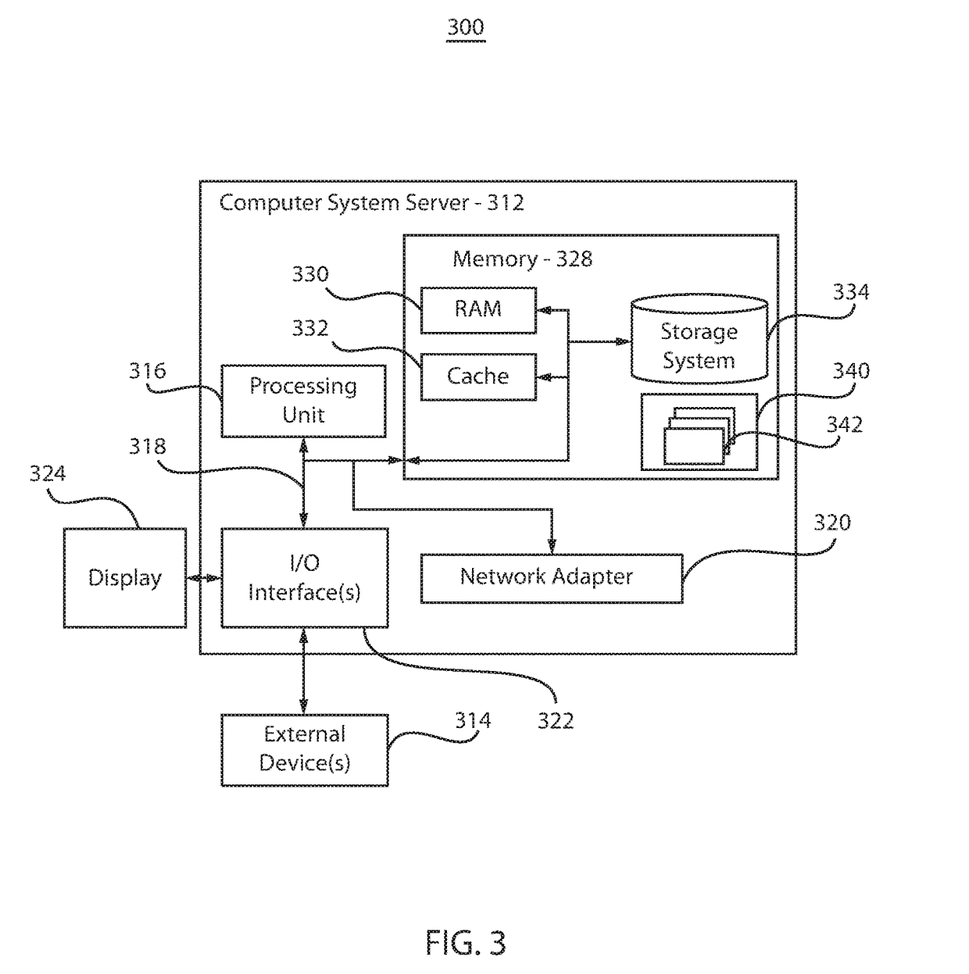
FIG. 3 is a block/flow diagram of an exemplary cloud computing node for processing a query for a NoSQL (non-structured query language) database, in accordance with an embodiment of the present invention.

FIG. 3 is a block/flow diagram of an exemplary cloud computing node for processing a query for a NoSQL (non-structured query language) database, in accordance with an embodiment of the present invention.

Computer system/server 312 in cloud computing node 300 is shown in the form of a general-purpose computing device. The components of computer system/server 312 can include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media can be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 can further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 can include at least one program product having a set (e.g., at least one) of program modules that are configured to carry out the functions of embodiments of the invention.

Program/utility 340, having a set (at least one) of program modules 342, can be stored in memory 328 by way of example, and not limitation, as well as an operating system, one or more application programs, other program modules, and program data. Each of the operating system, one or more application programs, other program modules, and program data or some combination thereof, can include an implementation of a networking environment. Program modules 342 generally carry out the functions and/or methodologies of embodiments of the invention as described herein.

Computer system/server 312 can also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
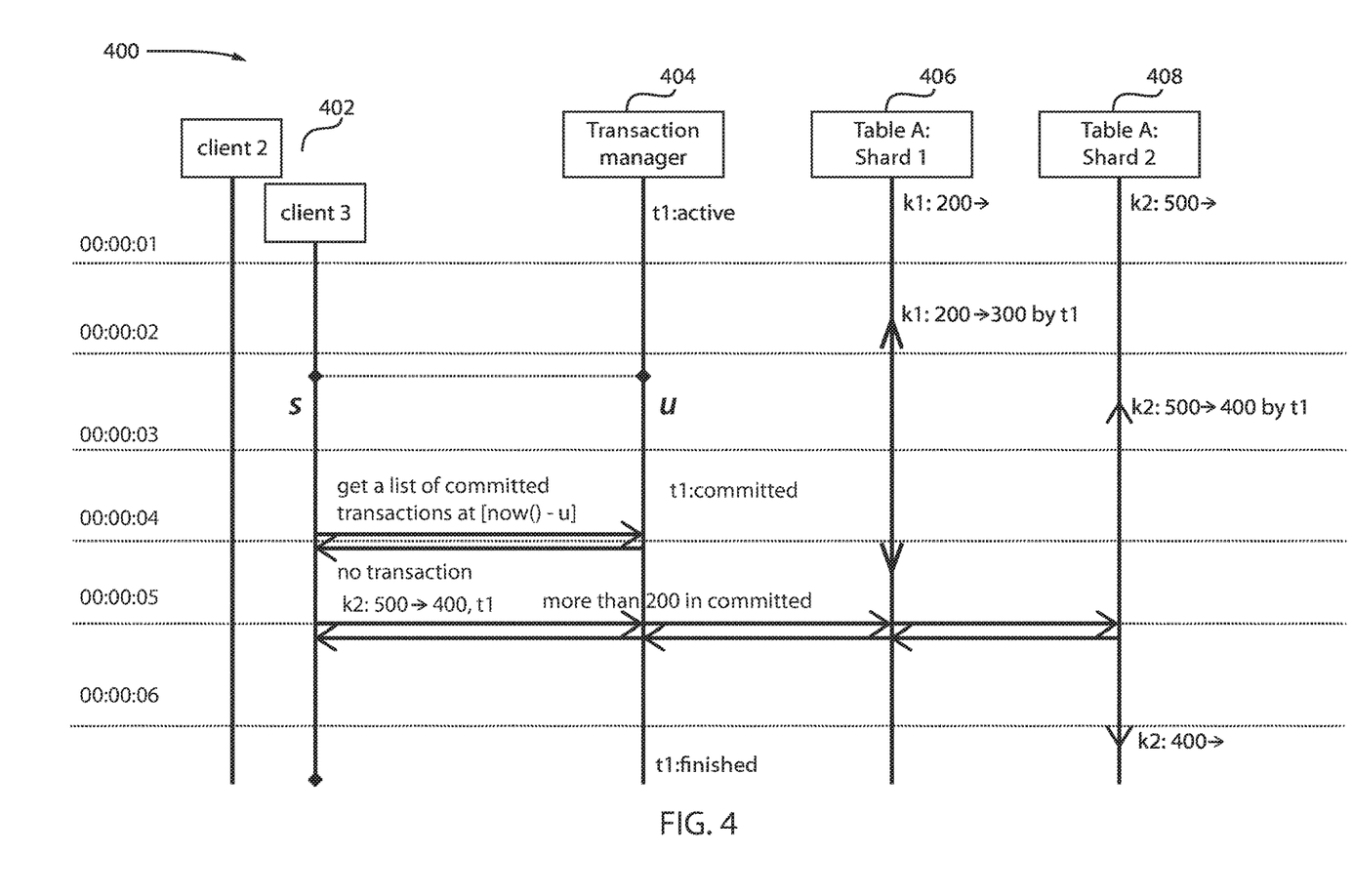
FIG. 4 is a block/flow diagram of an exemplary process for depicting relaxing consistency with bounded staleness to reduce query overheads, in accordance with an embodiment of the present invention.

FIG. 4 is a block/flow diagram 400 of an exemplary process for depicting relaxing consistency with bounded staleness to reduce query overheads, in accordance with an embodiment of the present invention.

NoSQL provides APIs of atomic CRUD operation for each data item. NoSQL, however, does not provide any way to update multiple data items in atomic. If clients use a two-phase commit on top of the NoSQL APIs, the clients can establish transactions (atomic updates of multiple data items).

A table for transaction management is defined and indicated by transaction manager line 404. A client 402 stores a transaction state (e.g., active, committed, aborted, and finished) in the transaction management table 404 with a key transaction ID (e.g., t1:active→t1:committed→t1:finished). The client 402 stores dirty data that the client is modifying in a transaction. The dirty data includes, e.g., committed version, dirty version, and transaction ID (i.e., k1: 200→300 by t1).

If the other client fetches the dirty data, the client checks the transaction state. If the transaction state is "committed," the client reads the new version. If the transaction state is "finished," the client fetches it again. Otherwise, the client reads the committed version. When the client changed the transaction state from "active" to "committed," the transaction is "committed." The other client can change the transaction state from "active" to "aborted." In this case, the client cannot change the state from "active" to "committed." After changing the state, all of the dirty data are modified. If the transaction is "committed," the client changes dirty versions added in the transaction the committed versions (k1: 300→). Then, the client changes the transaction state from "committed" to "finished." Most of NoSQL provides for query functions. Clients can get multiple data items with a single API, such as "more than 200." However, because the dirty data is stored in a NoSQL database and some of them may be committed, clients cannot read consistent items with the original NoSQL query function by querying only committed versions. To read consistent items, a client needs to call the query API twice for querying dirty versions and committed versions, respectively.

It is noted that the term "now( )" is a method that returns the current time, such as System.currentTimemills( ) in Java. The parameter "u" is a parameter that users can provide. The parameter "u" must be $0<u<(s-\Delta t)$. The parameter "c" is a parameter that can be determined by the system while running transactions. Most of transactions finish within "c." For example, "c" is calculated by percentile of 99.99% of elapsed time of transactions. Additionally, "u" must be longer than "c." FIG. 4 further illustrates a first shard 406 and a second shard 408. A database shard is a horizontal partition of data in a database.

Some of the clients can allow for relaxed consistency. For example, a client allows for the reading of a stale value. The staleness, however, should be bounded with s. This concept is known as "bounded staleness."

Staleness is a measure of anti-entropy propagation lag. Staleness can be described either in terms of a time interval or in terms of a number of write operations by which the secondaries are lagging behind the primary. When the consistency level is set to eventual, in theory, the staleness of the system does not have any guaranteed upper bound. In practice though, most of the time, a data store configured with consistency level of eventual provides up-to-date reads. In contrast, when the consistency level is set to strong, the staleness is said to be zero. When the level is set to consistent prefix, the staleness can be bounded between the extreme of strong and eventual, and can be configured by a developer at the cluster level.

As part of the configuration level, acceptable staleness can be specified, for instance with respect to concession prefix, session, or eventual consistency levels. By way of example, a developer can specify that it is acceptable that read operation have a staleness of no more than s, e.g., twenty operations or, e.g., thirty milliseconds.

The exemplary embodiments of the present invention aim to reduce query processing for a query result with bounded staleness. Referring to FIG. 4, client 402 checks or monitors active transactions at the timing before "u" second (00:00: 04). The NoSQL returns a list of active transaction states at [00:00:04–u]. "u" is larger than the elapsed time of a usual transaction processing. That is, in most cases, the NoSQL doesn't return any transaction states, as shown in FIG. 4. While at s–u from 00:00:04, the client 402 can get a query result with one query processing.

For example, assume a variable TimestampOfNoActiveTx. A determination of "u" is performed as follows. A client monitors the distribution of elapsed time of transactions. Periodically, the client updates "u" with a time which is longer than 99.9% of elapsed time. Then, active transactions are monitored as follows. The client sends a query to monitor active transactions periodically. A query is sent to fetch the states of active transactions at T=now( )–u. The query result is received. If the result doesn't include any active transactions (or is empty), the TimestampOfNoActiveTx is updated with T. Otherwise, for each transaction in the returned states (i) the client retrieves all of dirty versions of the transaction from NoSQL, (ii) the client moves the dirty versions to committed, and (iii) the client moves the transaction state from "committed" to "finished." When the client does get a query result, then if now( ) is less than TimestampOfNoActiveTx+s, the client sends a query to "committed" value, only. Otherwise, the client sends two or three queries to scan committed and dirty versions.

Figure 5:
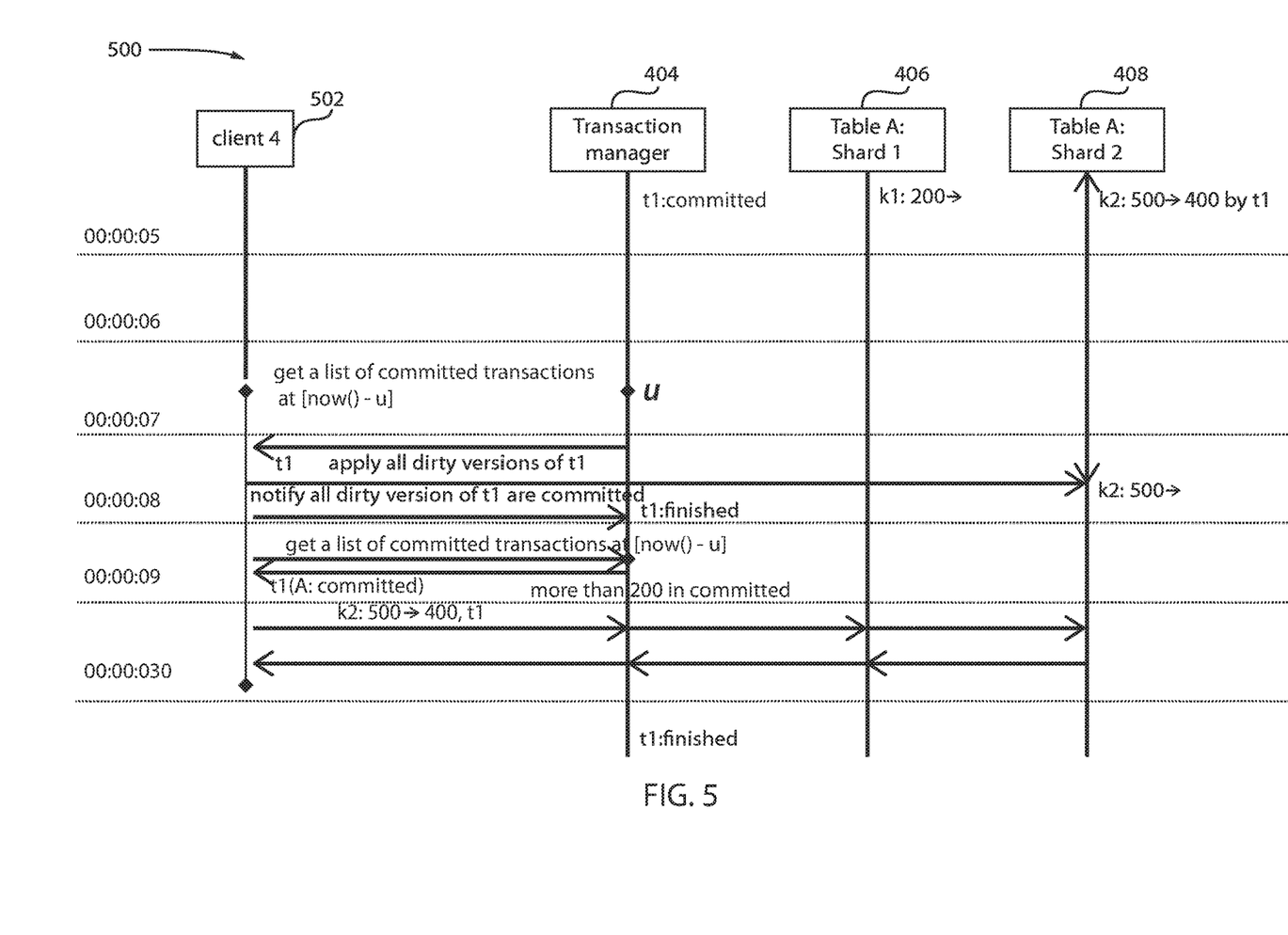
FIG. 5 is a block/flow diagram of an exemplary process for depicting a client committing all its dirty versions of the transaction, in accordance with an embodiment of the present invention.

FIG. 5 is a block/flow diagram 500 of an exemplary process for depicting a client committing all its dirty versions of the transaction, in accordance with an embodiment of the present invention.

When a client 502 detects an inflight transaction, the client 502 commits its dirty versions of the transaction. After committing the versions, the client 502 notifies the transaction manager that all dirty versions of the transaction are committed. Then, the following clients know that no dirty versions of the transaction exists.

Figure 6:
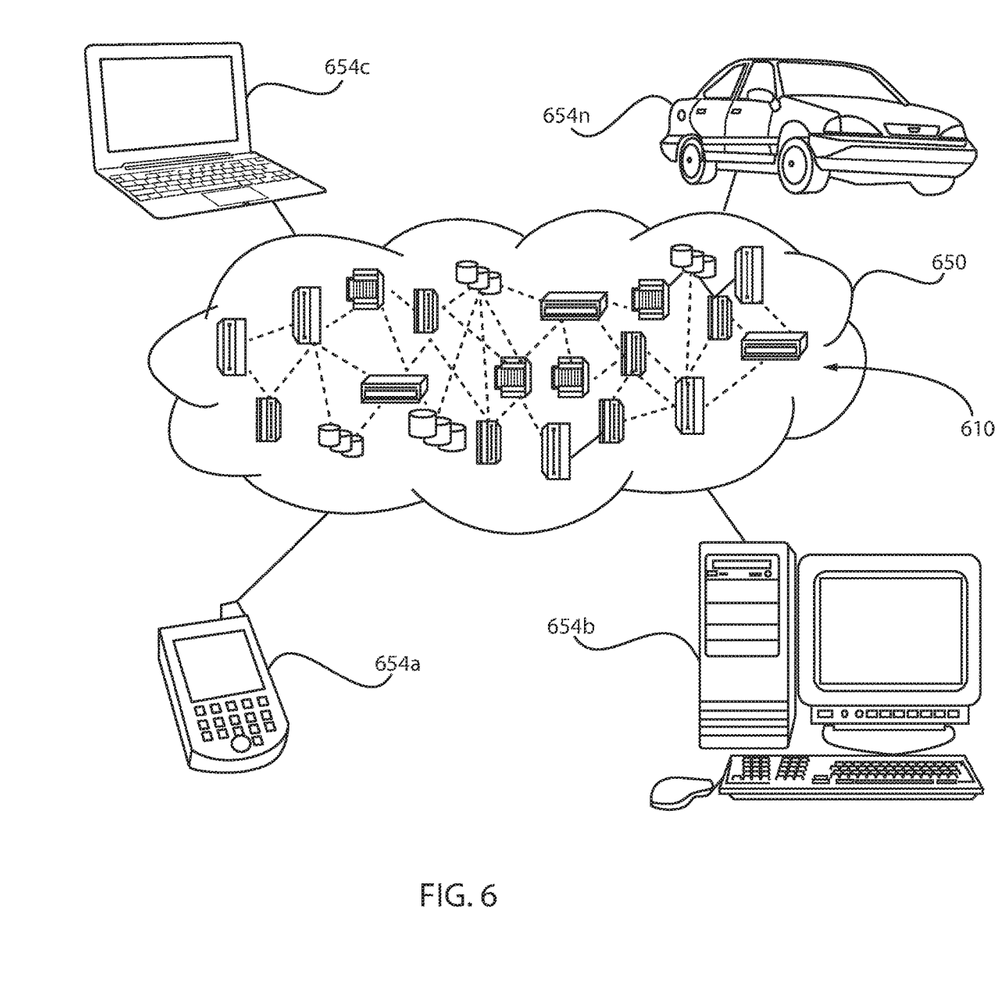
FIG. 6 is a block/flow diagram of an exemplary cloud computing environment, in accordance with an embodiment of the present invention.

FIG. 6 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 650 is depicted for enabling use cases of the present invention. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N can communicate. Nodes 610 can communicate with one another. They can be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
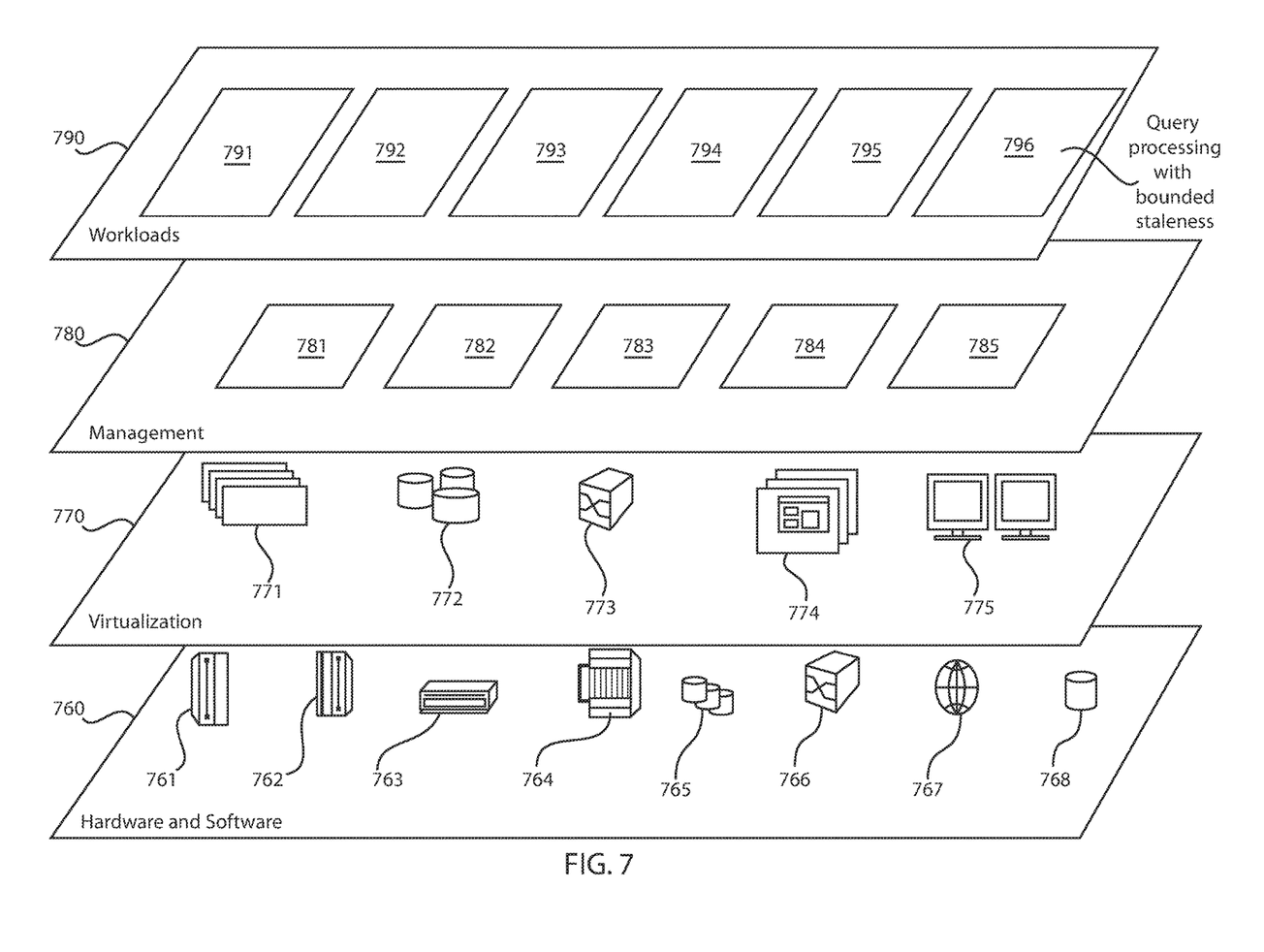
FIG. 7 is a schematic diagram of exemplary abstraction model layers, in accordance with an embodiment of the present invention.

FIG. 7 is a schematic diagram of exemplary abstraction model layers, in accordance with an embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities can be provided: virtual servers 771; virtual storage 772; virtual networks 773, including virtual private networks; virtual applications and operating systems 774; and virtual clients 775.

In one example, management layer 780 can provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment can be utilized. Examples of workloads and functions which can be provided from this layer include: mapping and navigation 791; software development and lifecycle management 792; virtual classroom education delivery 793; data analytics processing 794; transaction processing 795; and query processing with bounded staleness 796.

Figure 8:
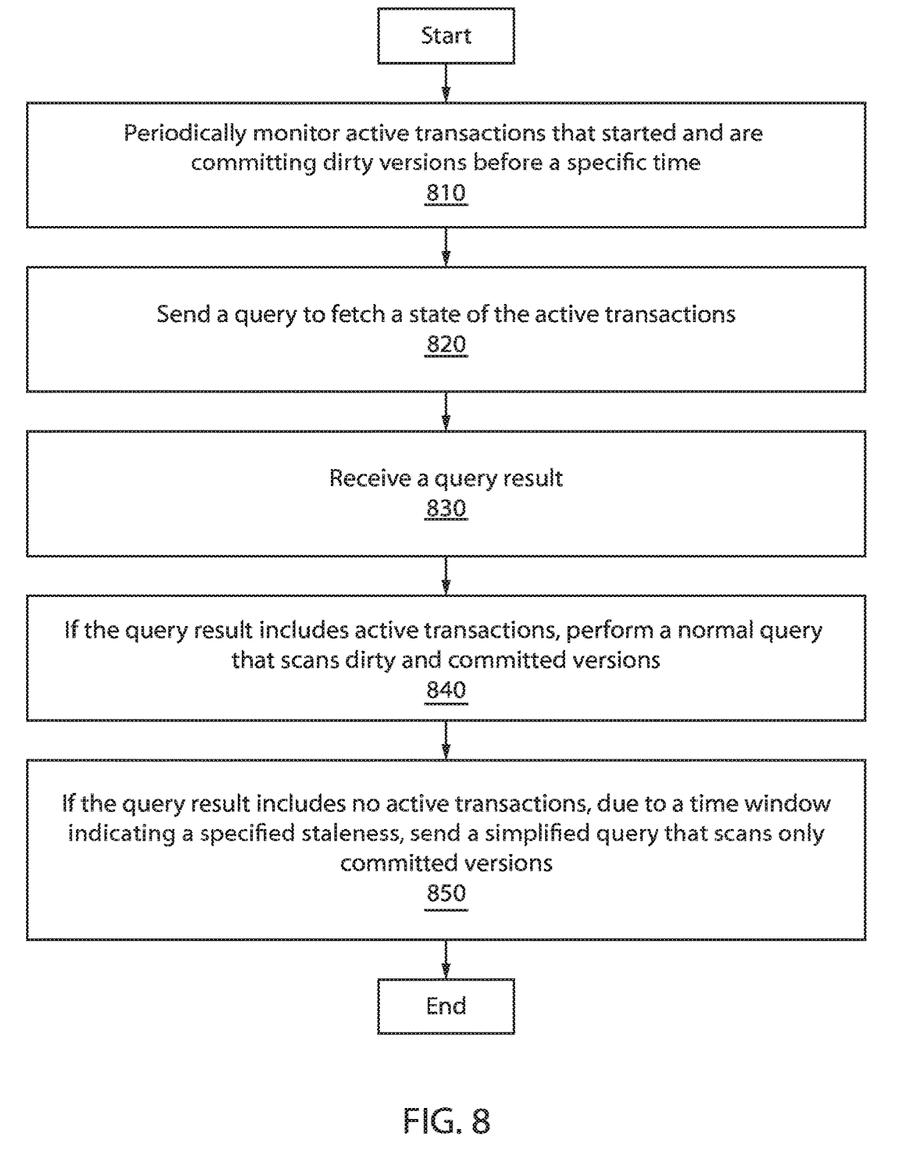
FIG. 8 is a block/flow diagram of an exemplary method for processing a query for a NoSQL (non-structured query language) database, in accordance with an embodiment of the present invention.

FIG. 8 is a block/flow diagram of an exemplary method for processing a query for a NoSQL (non-structured query language) database, in accordance with an embodiment of the present invention.

At block 810, active transactions that started and are committing dirty versions before a specific time are periodically monitored.

At block 820, a query is sent to fetch a state of the active transactions.

At block 830, a query result is received.

At block 840, if the query result includes active transactions, a normal query is performed that scans the dirty versions and the committed versions.

At block 850, if the query result includes no active transactions, due to a time window indicating a specified staleness, a simplified query that scans only committed versions is sent.

Still yet, any of the components of the present invention could be created, integrated, hosted, maintained, deployed, managed, serviced, etc. by a service supplier who offers to provide a method for enabling query processing. Thus, the present invention describes a process for deploying, creating, integrating, hosting, maintaining, and/or integrating computing infrastructure, including integrating computer-readable code into the query computing and processing systems 100, 200 (FIGS. 1 and 2), wherein the code in combination with the query computing and processing systems 100, 200 is capable of performing a method for enabling query processing in a NoSQL database. In another embodiment, the invention provides a business method that performs the process blocks/steps of the invention on a subscription, advertising, and/or fee basis. That is, a service supplier, such as a Solution Integrator, could offer to provide a method for enabling query processing. In this case, the service supplier can create, maintain, support, etc. a computer infrastructure that performs the process blocks/steps of the invention for one or more customers. In return, the service supplier can receive payment from the customer(s) under a subscription and/or fee agreement and/or the service supplier can receive payment from the sale of advertising content to one or more third parties.

The descriptions of the various embodiments of the present invention have been presented for purposes of illustration, but are not intended to be exhaustive or limited to the embodiments described. Many modifications and variations will be apparent to those of ordinary skills in the art without departing from the scope and spirit of the described embodiments. The terminology used herein was chosen to best explain the one or more embodiments, the practical application or technical improvement over technologies found in the marketplace, or to enable others of ordinary skills in the art to understand the embodiments described herein.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for query processing for a NoSQL (non-structured query language) database (which are intended to be illustrative and not limiting), it is noted that modifications and variations can be made by persons skilled in the art in light of the above teachings. It is therefore to be understood that changes can be made in the particular embodiments described which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method executed on one or more processors for processing a query for a NoSQL (non-structured query language) database, the method comprising:
periodically monitoring active transactions that started and are committing dirty versions before a specific time;
sending a query to fetch a state of the active transactions;
receiving a query result;
if the query result includes active transactions, performing a normal query that scans dirty and committed versions; and
if the query result includes no active transactions, due to a time window indicating a specified staleness, sending a simplified query that scans only committed versions.

2. The method of claim 1, wherein the normal query includes retrieving all dirty versions of a transaction state from the NoSQL database.

3. The method of claim 2, wherein the normal query further includes moving the dirty versions to committed.

4. The method of claim 3, wherein the normal query further includes altering the transaction state from committed to finished.

5. The method of claim 1, wherein the simplified query is sent for a committed version.

6. The method of claim 1, wherein, when active transactions are detected, the NoSQL database guarantees that the query result reflects all the latest committed versions at the indicated time window.

7. The method of claim 1, wherein the specified staleness is bounded.

8. The method of claim 1, wherein the active transactions are monitored before a predetermined time period.

9. A computer system for processing a query for a NoSQL database, the computer system comprising:
a memory; and
at least one processor in communication with the memory, wherein the computer system is configured to:
periodically monitor active transactions that started and are committing dirty versions before a specific time;
send a query to fetch a state of the active transactions;
receive a query result;
if the query result includes active transactions, perform a normal query that scans dirty and committed versions; and
if the query result includes no active transactions, due to a time window indicating a specified staleness, send a simplified query that scans only committed versions.

10. The computer system of claim 9, wherein the normal query includes retrieving all dirty versions of a transaction state from the NoSQL database.

11. The computer system of claim 10, wherein the normal query further includes moving the dirty versions to committed.

12. The computer system of claim 11, wherein the normal query further includes altering the transaction state from committed to finished.

13. The computer system of claim 9, wherein the simplified query is sent for a committed version.

14. The computer system of claim 9, wherein, when active transactions are detected, the NoSQL database guarantees that the query result reflects all the latest committed versions at the indicated time window.

15. The computer system of claim 9, wherein the specified staleness is bounded.

16. The computer system of claim 9, wherein the active transactions are monitored before a predetermined time period.

17. A non-transitory computer readable storage medium comprising a computer readable program for processing a query for a NoSQL database, wherein the computer readable program when executed on a computer causes the computer to perform the steps of:
periodically monitoring active transactions that started and are committing dirty versions before a specific time;
sending a query to fetch a state of the active transactions;
receiving a query result;
if the query result includes active transactions, performing a normal query that scans dirty and committed versions; and
if the query result includes no active transactions, due to a time window indicating a specified staleness, sending a simplified query that scans only committed versions.

18. The non-transitory computer readable storage medium of claim 17, wherein the normal query includes retrieving all dirty versions of a transaction state from the NoSQL database.

19. The non-transitory computer readable storage medium of claim 18, wherein the normal query further includes moving the dirty versions to committed.

20. The non-transitory computer readable storage medium of claim 19, wherein the normal query further includes altering the transaction state from committed to finished.

* * * * *